US010672192B2

(12) United States Patent
Jeong et al.

(10) Patent No.: US 10,672,192 B2
(45) Date of Patent: Jun. 2, 2020

(54) DISPLAY DEVICE, USER TERMINAL DEVICE, DISPLAY SYSTEM INCLUDING THE SAME AND CONTROL METHOD THEREOF

(71) Applicant: SAMSUNG ELECTRONICS CO., LTD., Suwon-si (KR)

(72) Inventors: Hee-seok Jeong, Suwon-si (KR); Sang-young Lee, Anyang-si (KR); Kyu-hyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/106,905

(22) Filed: Aug. 21, 2018

(65) Prior Publication Data

US 2019/0114837 A1      Apr. 18, 2019

(30) Foreign Application Priority Data

Oct. 12, 2017   (KR) ......................... 10-2017-0132056

(51) Int. Cl.
*G06T 19/00*       (2011.01)
*H04N 21/422*    (2011.01)
(Continued)

(52) U.S. Cl.
CPC .......... *G06T 19/006* (2013.01); *G06F 3/0484* (2013.01); *G06F 3/0485* (2013.01);
(Continued)

(58) Field of Classification Search
CPC ... G06T 19/006; G06T 19/003; G06F 3/0485; H04N 21/4126; H04N 21/4222
See application file for complete search history.

(56) References Cited

U.S. PATENT DOCUMENTS 9,881,425 B1 *   1/2018   Scott ..................... G06T 19/006
2012/0306722 A1   12/2012   Kim et al.
(Continued)

FOREIGN PATENT DOCUMENTS

JP           2010-45521 A       2/2010
KR    10-2012-0133550 A      12/2012
(Continued)

OTHER PUBLICATIONS

International Search Report dated Jan. 14, 2019 by the International Searching Authority in counterpart International Patent Application No. PCT/KR2018/011784.
(Continued)

*Primary Examiner* — Ryan R Yang
(74) *Attorney, Agent, or Firm* — Sughrue Mion, PLLC

(57) ABSTRACT

A display device and a method thereof are provided. The display device includes a display, a communicator, and a processor to display a virtual reality (VR) content on the display, in response to a trigger signal and motion information to change a display viewpoint area of the VR content being received from a user terminal device through the communicator, control the display to display by changing a display viewpoint area of the VR content based on first motion direction included in the motion information until a predetermined signal is received. In response to the predetermined signal being received from the user terminal device, control the display to terminate changing the display viewpoint area.

20 Claims, 14 Drawing Sheets

(51) Int. Cl.
   *G06F 3/0485*   (2013.01)
   *H04N 21/81*   (2011.01)
   *G06F 3/0484*   (2013.01)
   *G06F 3/16*   (2006.01)
   *G09G 5/377*   (2006.01)
   *H04N 21/218*   (2011.01)
   *H04N 21/41*   (2011.01)

(52) U.S. Cl.
   CPC ............ *G06F 3/167* (2013.01); *G09G 5/377* (2013.01); *H04N 21/21805* (2013.01); *H04N 21/4126* (2013.01); *H04N 21/42222* (2013.01); *H04N 21/816* (2013.01); *G06F 2203/04806* (2013.01)

(56) References Cited

U.S. PATENT DOCUMENTS

2013/0314320 A1   11/2013   Hwang et al.
2013/0322844 A1*  12/2013   Suzuki .................... H04N 9/87
                                                  386/230
2014/0195989 A1   7/2014    Choi et al.
2015/0326659 A1   11/2015   Cheng et al.
2016/0364915 A1   12/2016   Smith et al.
2017/0144068 A1   5/2017    Cohen

FOREIGN PATENT DOCUMENTS

| KR | 10-2015-0081176 A | 7/2015 |
| KR | 10-2015-0089529 A | 8/2015 |
| KR | 10-1648564 B1 | 8/2016 |
| KR | 10-2017-0013737 A | 2/2017 |
| WO | 2014/150728 A1 | 9/2014 |

OTHER PUBLICATIONS

Written Opinion dated Jan. 14, 2019 by the International Searching Authority in counterpart International Patent Application No. PCT/KR2018/011784.

\* cited by examiner

10

TRANSMIT TRIGGER SIGNAL AND MOTION INFORMATION

DISPLAY DEVICE, USER TERMINAL DEVICE, DISPLAY SYSTEM INCLUDING THE SAME AND CONTROL METHOD THEREOF

CROSS-REFERENCE TO RELATED APPLICATION

This application is based on and claims priority under 35 U.S.C. § 119 to Korean Patent Application No. 10-2017-0132056, filed on Oct. 12, 2017, in the Korean Intellectual Property Office, and the disclosure of which is incorporated by reference herein in its entirety.

BACKGROUND

1. Field

The disclosure broadly relates to apparatuses and methods of displaying virtual reality (VR) content, a user terminal device, a display system including the same, and a control method thereof.

2. Description of Related Art

In general, virtual reality (VR) technology is a technology that participant's all senses (visual, auditory, olfactory, tasty, tactile) of the human body interact with each other in a 3D virtual environment that is created through computer graphics (CG) and is similar to a real environment, causing the participant to immerse in the virtual world. This is the technology that ultimately aims to maximize the utilization of information by reproducing the virtual space three-dimensionally and making the participant immersed in the virtual space.

To implement VR technology, there is a method of wearing a VR headset, and a method of watching a VR image in a fixed display such as a TV.

In a case of a wearable type, a user wearing a VR headset can easily change directions by turning the head in any direction including up and down directions.

However, in a case of the fixed type, a user may change displaying timing by pressing a button of a remote controller connected to the display device or by directly moving the remote controller, or by operating a pointer moving in the 2D plane in the same manner as a mouse.

However, when a user wishes to move the viewpoint area to a long distance from the currently displayed viewpoint area, it is inconvenient to continuously operate the buttons of the remote controller or the pointer displayed on a screen.

The above information is presented as background information only to assist with an understanding of the present disclosure. No determination has been made, and no assertion is made, as to whether any of the above might be applicable as prior art with regard to the present disclosure.

SUMMARY

In accordance with an aspect of the disclosure there are provided a display device which is capable of continuously changing a display viewpoint area of a VR content based on motion information of a user terminal device, a user terminal device, a display system including the same, and a control method thereof.

Illustrative, non-limiting embodiments may overcome the above disadvantages and other disadvantages not described above. The present disclosure is not necessarily required to overcome any of the disadvantages described above, and illustrative, non-limiting embodiments may not overcome any of the problems described above. The appended claims should be consulted to ascertain the true scope of an inventive concept.

According to an aspect of the disclosure, there is provided a display device which includes a display, a communicator, and a processor to display a virtual reality (VR) content on the display, in response to a trigger signal and motion information to change a display viewpoint area of the VR content being received from a user terminal device through the communicator, control the display to display by changing a display viewpoint area of the VR content based on first motion direction included in the motion information until a predetermined signal is received, and in response to the predetermined signal being received from the user terminal device, control the display to terminate changing the display viewpoint area.

The processor may, in response to motion information which includes a second motion direction which is different from the first motion direction being received while the display viewpoint area of the VR content is being changed based on the first motion direction, change the display viewpoint area of the VR content based on the second motion direction until the predetermined signal is received.

The processor may, in response to a motion speed included in the motion information being greater than or equal to a predetermined value, change the display viewpoint area of the VR content based on the first motion direction included in the motion information.

The processor may change the display viewpoint area of the VR content at a predetermined speed based on the first motion direction.

The processor may, in response to a motion speed included in the motion information being equal to or greater than a predetermined value and less than a first threshold, control a speed at which a display viewpoint area of the VR content is changed to a first speed, and in response to the motion speed being equal to or greater than the first threshold and less than a second threshold, control a speed at which a display viewpoint area of the VR content is changed to a second speed.

The processor may display the displayed VR content by enlarging or reducing the VR content until the predetermined signal is received based on a third motion direction included in the motion information.

The processor may, even if the motion information is not additionally received from the user terminal device, change a display viewpoint area of the VR content based on the first motion direction until the predetermined signal is received.

The processor may periodically receive the motion information from the user terminal device, and even if it is identified (determined) that there is no movement of the user terminal device based on the motion information, and change a display viewpoint area of the VR content based on the first motion direction until the predetermined signal is received.

The motion information may be obtained (generated) from a predetermined application that is installed in the user terminal device.

According an exemplary embodiment, a display system including a display device and a user terminal device includes a display device displaying a virtual reality (VR) content, and a user terminal device configured to sense a motion for controlling the display device and transmit motion information based on the sensed motion to the display device. The display device may, in response to a trigger signal and motion information to change a display viewpoint area of the VR content being received from a user terminal device, control the display to display by changing a display viewpoint area of the VR content based on first motion direction included in the motion information until a predetermined signal is received, and in response to the predetermined signal being received from the user terminal device, control the display to terminate changing the display viewpoint area.

The display device may, in response to motion information which includes a second motion direction which is different from the first motion direction being received while the display viewpoint area of the VR content is being changed based on the first motion direction, change the display viewpoint area of the VR content based on the second motion direction until the predetermined signal is received.

The user terminal device may, in response to the motion information being updated while the screen touch is maintained, transmit the updated motion information to the display device.

According to an exemplary embodiment, a control method of a display includes receiving a trigger signal for changing a display viewpoint area of a VR content and the motion information from a user terminal device; displaying by changing a display viewpoint area of the VR content based on a first motion direction included in the motion information until a predetermined signal is received; and in response to the predetermined signal being received from the user terminal device, terminating changing the display viewpoint area.

The changing and displaying may include, in response to motion information which includes a second motion direction which is different from the first motion direction being received while the display viewpoint area of the VR content is being changed based on the first motion direction, changing the display viewpoint area of the VR content until the predetermined signal is received based on the second motion direction.

The changing and displaying may include, in response to a motion speed included in the motion information being greater than or equal to a predetermined value, changing the display viewpoint area of the VR content based on the first motion direction included in the motion information.

The changing and display may include changing the display viewpoint area of the VR content at a predetermined speed based on the first motion direction.

The changing and displaying may include, in response to a motion speed included in the motion information being equal to or greater than a predetermined value and less than a first threshold, controlling a speed at which a display viewpoint area of the VR content is changed to a first speed, and in response to the motion speed being equal to or greater than the first threshold and less than a second threshold, controlling a speed at which a display viewpoint area of the VR content is changed to a second speed.

The changing and displaying may include, even if the motion information is not additionally received from the user terminal device, changing a display viewpoint area of the VR content based on the first motion direction until the predetermined signal is received.

The display device periodically receives the motion information from the user terminal device, and the changing and displaying may include, even if it is determined that there is no movement of the user terminal device based on the motion information, changing a display viewpoint area of the VR content based on the first motion direction until the predetermined signal is received.

According to an exemplary embodiment, a non-volatile computer readable medium which stores computer instructions to operate the display device when executed by a processor the display device is provided. Here, the operation may include receiving a trigger signal for changing a display viewpoint area of a VR content and the motion information from a user terminal device, displaying by changing a display viewpoint area of the VR content based on a motion direction included in the motion information until a predetermined signal is received, and in response to the predetermined signal being received from the user terminal device, terminating changing the display viewpoint area.

According to the various embodiments described above, the display viewpoint area of the VR contents displayed on the display device can be easily and continuously changed by a simple operation, thereby improving convenience for a user.

BRIEF DESCRIPTION OF THE DRAWINGS

The above and/or other aspects, features, and advantages of certain embodiments of the present disclosure will become more apparent from the following description taken in conjunction with the appended drawings. Understanding that these drawings depict only certain embodiments and are therefore not to be considered to be limiting of the scope of the disclosure, the principles herein are described and explained with additional specificity and detail via the use of the accompanying drawings, in which.

DETAILED DESCRIPTION OF EXEMPLARY EMBODIMENTS

Figure 1:
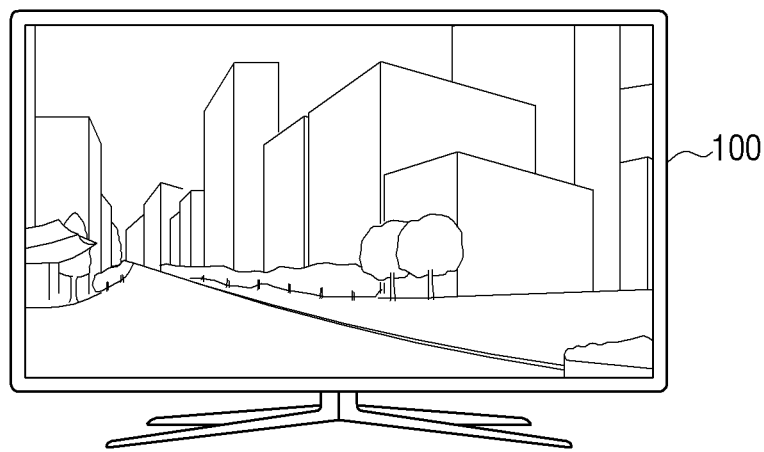
FIG. 1 is a mimetic diagram illustrating a configuration of a display system according to an embodiment.
Figure 1:
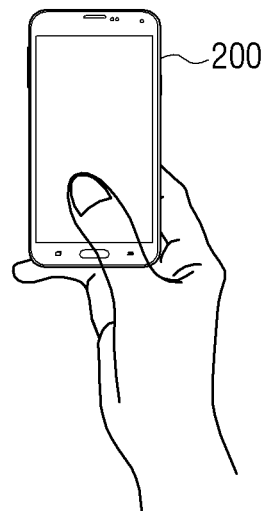

Certain embodiments will now be described in greater detail with reference to the accompanying drawings.

Hereinafter, the present disclosure will be described in detail with reference to the drawings. In the following description, detailed description of known functions and configurations incorporated herein will be omitted when it may make the subject matter of the present disclosure rather unclear. In addition, the following exemplary embodiments can be modified into various other forms, and the scope of the technical idea of the present disclosure is not limited to the following examples. Rather, these exemplary embodiments are provided so that this disclosure will be more thorough and complete, and will fully convey the scope of the present disclosure to those skilled in the art.

Also, to include an element does not exclude other elements, but may include other elements, unless specifically stated otherwise. Further, various elements and regions in the drawings are schematically drawn. Accordingly, the spirit of the present disclosure is not limited by the relative size or spacing depicted in the accompanying drawing.

Below, certain exemplary embodiments will be described in detail with reference to the accompanying drawings.

FIG. 1 is a mimetic diagram illustrating a configuration of a display system according to an exemplary embodiment.

According to FIG. 1, a display system 10 according to an exemplary embodiment includes a display device 100 and a user terminal device 200.

The display device 100 can be implemented so as to be controllable by the user terminal device 200. For example, the display device 100 may be implemented as a TV. The display device can be implemented as various types of electronic device such as a PC, a large format display (LFD), a digital signage, a digital information display (DID), a video wall, a projector display, which have a display function and are controllable by the user terminal device 200.

The display device 100 can display the VR content. Here, the VR content refers to a panorama image of 360 degree in an omnidirectional point of view, which enables three-dimensional viewing that cannot be provided by existing contents. This VR content can be viewed by a user by selecting a desired direction in an omnidirection of 360 degrees, not being dependent on a specific viewpoint of a photographer. In some cases, however, VR content may be implemented by images of 180 degrees, 270 degrees, etc. instead of 360 degrees.

The user terminal device 200 has a function of controlling the display device 100. The user terminal device 200 can be implemented as, for example, a smart phone. However, the present disclosure is not limited thereto as long as it is a device capable of recognizing a motion of a user holding the user terminal device 200. For example, the device may be implemented as a remote controller or a tablet PC.

In related art, in order to continuously change a display viewpoint area of the VR contents displayed on the display device 100, a control device such as a remote controller has to be continuously moved. That is, when the viewpoint area to be watched by the user is far away from the currently displayed viewpoint area, the user may feel inconvenience to move the control device in the direction to view the control device or continuously input a specific key.

According to an exemplary embodiment, the display device 100 may continuously change the display viewpoint area of the VR content based on the motion information received from the user terminal device 200. The various exemplary embodiments of the present disclosure will be described in a greater detail.

Figure 2:
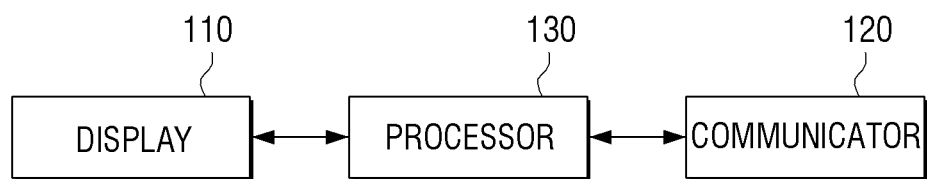
FIG. 2 is a block diagram illustrating a configuration of a display device according to an embodiment.

FIG. 2 is a block diagram illustrating a configuration of a display device according to an exemplary embodiment.

According to FIG. 2, the display device 100 includes a display 110, a communicator 120, and a processor 130.

The display 110 outputs content. Here, the output content may be a VR content which includes an image of 360 degrees but is not limited thereto. A general 2D content can be included as well.

The display 110 may be implemented as various shapes such as liquid crystal display (LCD), organic light-emitting diode (OLED), liquid crystal on silicon (LCoS), digital light processing (DLP), and quantum dot (QD) display panel.

The communicator 120 performs communication with the user terminal device 200. Here, the communicator 120 may perform wireless communication with the user terminal device 200 through a communication method such as BluTooth (BT), Wireless Fidelity (WI-FI), Zigbee, infrared (IR) and so on, and may communicate with the user terminal device 200 via various communication methods such as serial interface, universal serial bus (USB), and near field communication (NFC).

For example, when the predetermined event occurs, the communicator 120 can perform the communication according to the predetermined communication method with the user terminal device 200 to be in an interlocked state. Here, the interlocking may mean all the states in which the communication between the display device 100 and the user terminal device 200 becomes ready for communication, such as initialization of communication, operation of forming a network, operation of performing device pairing, and the like. For example, the device identification information of the user terminal device 200 may be provided to the display device 100, and a pairing procedure therebetween can be performed. For example, when a predetermined event occurs in the display device 100 or the user terminal device 200, a peripheral device can be searched through a digital living network alliance (DLNA) technology, and a pairing operation can be performed with the searched device to be in an interlocked state.

The processor 130 controls overall operations of the display device 100.

According to one exemplary embodiment, the processor 130 may be implemented as a digital signal processor (DSP) which processes digital signals, a microprocessor, or a microcontroller, but is not limited thereto. The processor 130 may include one or more of a central processing unit (CPU), a microcontroller unit (MCU), a micro processing unit (MPU), a controller, an application processor (AP), a communication processor (CP), and an ARM processor, or can be defined as the terms. The processor 140 may be implemented as a system on chip (SoC) or a large scale integration (LSI) with a processing algorithm incorporated therein. Alternatively, the processor 130 may be implemented as a field programmable gate array (FPGA).

When the motion information is received from the user terminal device 200 through the communicator 120 while the VR contents are displayed on the display 110, the processor 130 may change the display viewpoint area of the VR content based on the received motion information.

The motion information refers to information about the motion of the user terminal device 200. For example, the motion information may include at least one of a motion speed indicating a movement speed, a motion direction indicating a movement direction, and a rotation speed indicating a rotation movement speed of the user terminal device 200.

The processor 130 may receive the trigger signal for changing the display viewpoint area of the VR contents from the user terminal device 200 through the communicator 120 and the motion information of the user terminal device 200. Then, when the trigger signal and the motion information are received, the processor 130 may change and display the display viewpoint area of the VR contents based on the first motion direction included in the motion information until a predetermined signal is received.

The processor 130 may terminate the change of the display viewpoint area when a predetermined signal is received from the user terminal device 200. Here, the display viewpoint area of the VR content refers to a specific viewpoint area currently displayed in the VR content on the display device 100. For example, when the motion information of the right direction is received, the processor 130 may display the image of the right view on the basis of the currently displayed viewpoint area. That is, the display viewpoint area can be continuously changed so that the image area on the right side of the image area displayed at the center of the current screen is displayed at the center of the screen.

Here, the trigger signal can be generated by a user touching a screen of the user terminal device 200, for example, a specific touch area. In this case, the trigger signal may be transmitted to the display device 100 at the same time as the generation, or may be transmitted to the display device 100 together with motion information generated thereafter. However, the present disclosure is not limited thereto, and may be generated based on an operation to press a predetermined button (for example, a home button) provided in the user terminal device 200, and a user motion which is distinguished from a user motion for continuously changing the display viewpoint of the VR content. For example, a trigger signal may be generated if the user rotates the user terminal device 200 clockwise or counterclockwise, or if there is a motion to move the user terminal device 200 forward or backward. However, for convenience of description, it will be described that the trigger signal is generated by touching the screen of the user terminal device 200.

When the motion information including the second motion direction different from the first motion direction is received while changing the display viewpoint area of the VR content based on the first motion direction, the processor 130 may continuously change the display viewpoint area of the VR content until the predetermined signal is received based on the second motion direction. For example, while changing the display viewpoint area to the right according to the motion information in the right direction, that is, continuously changing the display viewpoint area so that the right image area is positioned at the center of the screen based on the image area displayed in the center of the current screen, the displaying viewpoint area can be continuously changed until the predetermined signal is received so that the upper image area is positioned at the center of the screen based on the image area displayed in the center of the current screen. Such change of the display viewpoint area can be continuously performed until a predetermined signal is received. That is, the processor 130 may successively change the display viewpoint area based on the changed motion direction when the motion direction included in the received motion information is changed before the command for terminating the display viewpoint area change is received.

According to an exemplary embodiment, a trigger signal is transmitted to the display device 100 at least once when the screen touch of the user terminal device 200 is started, and thereafter, a predetermined signal including an instruction to end the change of the display viewpoint area at the touching end point can be transmitted to the display device 100. Here, the predetermined signal may be the same signal as the trigger signal, or may be a different signal. For example, when the trigger signal is received, the processor 130 may initiate a display viewpoint area change and terminate the display viewpoint area change when the same signal is received again.

In this case, the processor 130 may continuously change the display viewpoint area based on the motion information initially received together with the trigger signal or after receiving the trigger signal, but does not change the viewpoint area until the predetermined end signal is received.

According to another exemplary embodiment, the trigger signal may be continuously or periodically generated and transmitted to the display device 100 while the screen touch of the user terminal device 200 is maintained. In this case, the processor 130 may continuously change the viewpoint area of the VR contents while the trigger signal and the motion information are received, and terminate the display viewpoint area change when the reception of the trigger signal is suspended.

The user terminal device 200 can transmit only the motion information after the user touch operation to the display device 100. In this case, the user terminal device 200 performs motion recognition even before the user touch operation, and may transmit only the motion information generated after the touch operation to the display device 100, or initiate the motion recognition after there is a user's touch operation.

The user terminal device 200 can transmit only the changed motion information after transmitting the generated motion information after the user touch operation without transmitting the generated same motion information. In this case, the processor 130 may continuously change the display viewpoint area based on the first motion information received first after the reception of the trigger signal, and keep changing the viewpoint area based on the first motion information until the predetermined ending signal is received. However, when the second motion information different from the first motion information is received before the predetermined ending signal is received, the processor 130 may keep changing the viewpoint area until the predetermined ending signal is received based on the second motion information.

Alternatively, the user terminal device 200 can transmit motion information continuously or periodically to the display device 100 while the touch is maintained, and stop transmission of the motion information when the touch ends. In this case, the processor 130 may continuously change the viewpoint area of the VR content while the motion information is received, and terminate the display viewpoint area change when the reception of the motion information is stopped.

For convenience of description, it is described that the user terminal device 200 transmits a trigger signal at least once to the display device 100 at the starting point of the screen touch and transmits a predetermined signal including an instruction to end the display viewpoint area change to the display device 100 at the touch ending time.

According to one exemplary embodiment, when the trigger signal and the motion information are received, the processor 130 may continuously change the display viewpoint area of the VR content based on the first motion direction included in the motion information regardless of motion speed included in the motion information.

According to another exemplary embodiment, the processor 130 may change the display viewpoint area of the VR content based on the first motion direction included in the motion information if the motion speed included in the motion information is greater than or equal to a predetermined value.

That is, the processor 130, only when a user moves the user terminal device 200 at a speed equal to or higher than a predetermined speed, may determine that a user intends to change the display viewpoint area.

Therefore, the processor, if the trigger signal and the motion information including the direction information are received from the user terminal device 200, may not change the display viewpoint area if the motion speed is less than a predetermined speed.

Meanwhile, according to one exemplary embodiment, the processor 130 may change the display viewpoint area of the VR content to a predetermined speed based on the first motion direction. For example, the processor 130 may change the viewpoint area of the display to a predetermined speed regardless of the motion speed included in the motion information. For example, the processor 130 may continuously change the display viewpoint area of the VR content at a default speed.

According to another exemplary embodiment, the processor 130 may maintain a default speed only for a predetermined time, and may gradually decrease the change speed after a predetermined time has elapsed. Alternatively, the processor 130 may gradually or gradually reduce the changing speed of the display viewpoint area of the VR content at a predetermined speed. This is because, if the display viewpoint point area is rapidly changed, it may be difficult for a user to accurately select the display viewpoint area, for example, it may be difficult for the user to end the touch accurately at the display viewpoint where the corresponding viewpoint area is displayed. Accordingly, the processor 130 may adjust the speed so that the user can accurately select the display viewpoint area to be viewed.

According to another exemplary embodiment, the processor 130 may change the display viewpoint area of the VR content to a corresponding speed based on the motion speed included in the motion information.

For example, if the motion speed included in the motion information is equal to or greater than a predetermined value but less than the first threshold, the processor 130 may control the speed at which the display viewpoint area of the VR content is changed to the first speed, and if the motion speed is equal to or greater than the first threshold value and less than the second threshold value, control the speed at which the display viewpoint area of the VR contents is changed to the second speed. However, the present disclosure is not limited thereto, and if there are a plurality of threshold values equal to or greater than the second threshold value, the display viewpoint area of the VR contents can be continuously changed at a speed corresponding to each speed section.

According to one example, if the display viewpoint area that the user wants to view is close to the currently displayed viewpoint area, the user can move the user terminal device 200 at a speed that is greater than a predetermined value and less than the first threshold value.

Accordingly, the processor 130 can change the display viewpoint area to a relatively slow first speed so that the user can precisely select a desired viewpoint area. In addition, if the display viewpoint area that the user wants to view is a viewpoint area that is far from the currently displayed viewpoint area, the user can move the user terminal device 200 to a first threshold value or more. Accordingly, the processor 130 can change the display viewpoint area at a relatively high speed and display the viewpoint area to be viewed by the user in a short time.

The processor 130 may enlarge or reduce the VR content which is displayed based on the third motion direction included in the motion information until a predetermined signal is received.

Here, the third motion direction for enlarging or reducing the VR content may be a direction for rotating the user terminal device 200 clockwise or counterclockwise. Accordingly, the motion for enlarging or reducing may include motion rotation information in addition to motion direction information.

The present disclosure is not limited thereto and the direction may be a direction to moving the user terminal device 200 forward or backward.

As described above, according to various exemplary embodiments of the present disclosure, it is possible to continuously change the display viewpoint area of VR contents until a predetermined signal is received, by only one operation of moving the user terminal device 200 in a specific direction.

According to an exemplary embodiment of the present disclosure, the motion information of the user terminal device 200 may be information generated in a predetermined application installed in the user terminal device 200. Accordingly, it is possible to receive and process the motion information of the user terminal device 200 only by installing an application compatible with the application installed in the user terminal device 200 without changing such as adding a separate product to the display device 100.

Figure 3A:
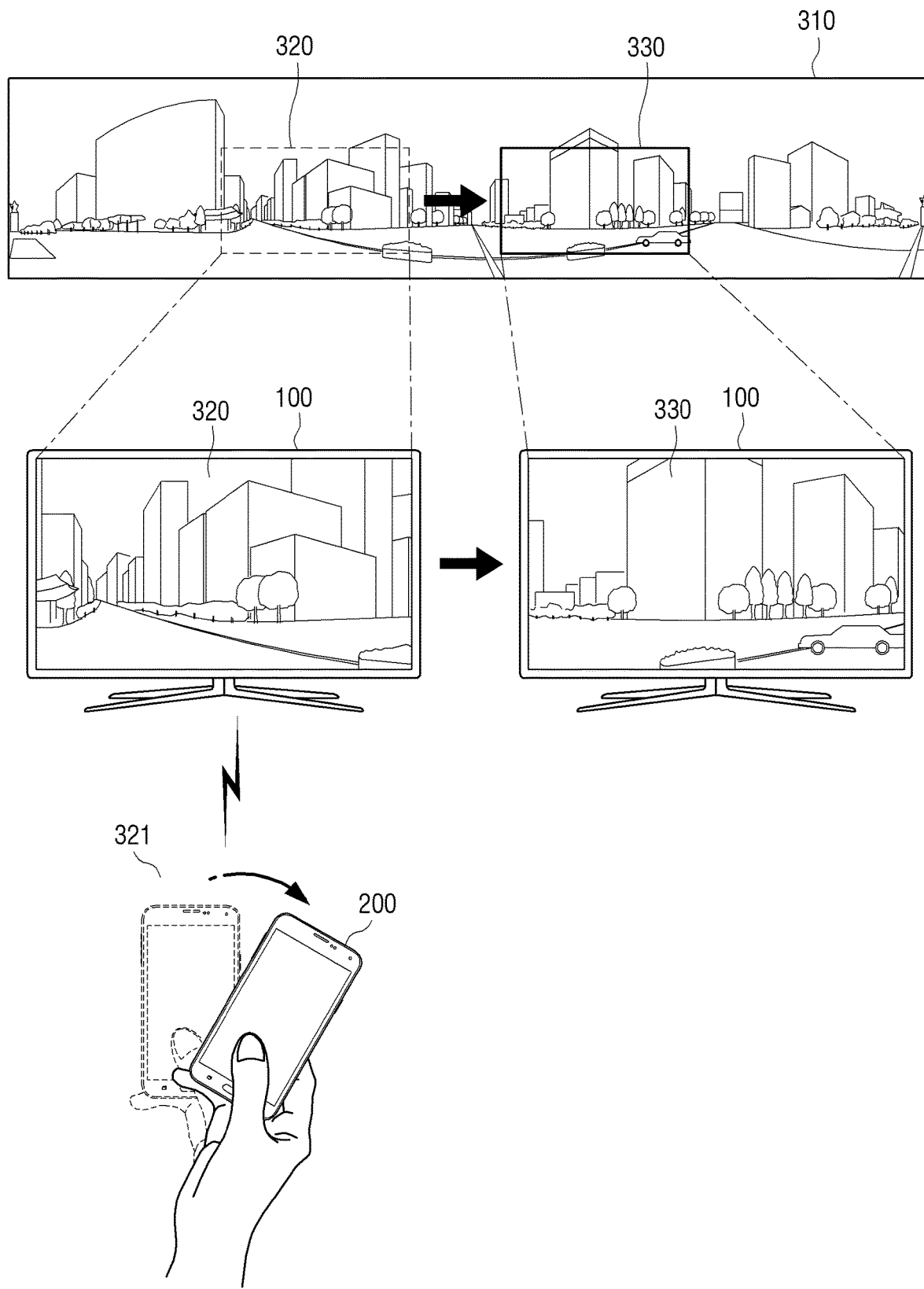
FIGS. 3A to 3C are views illustrating changing a direction of a display viewpoint area according to an embodiment.
Figure 3B:
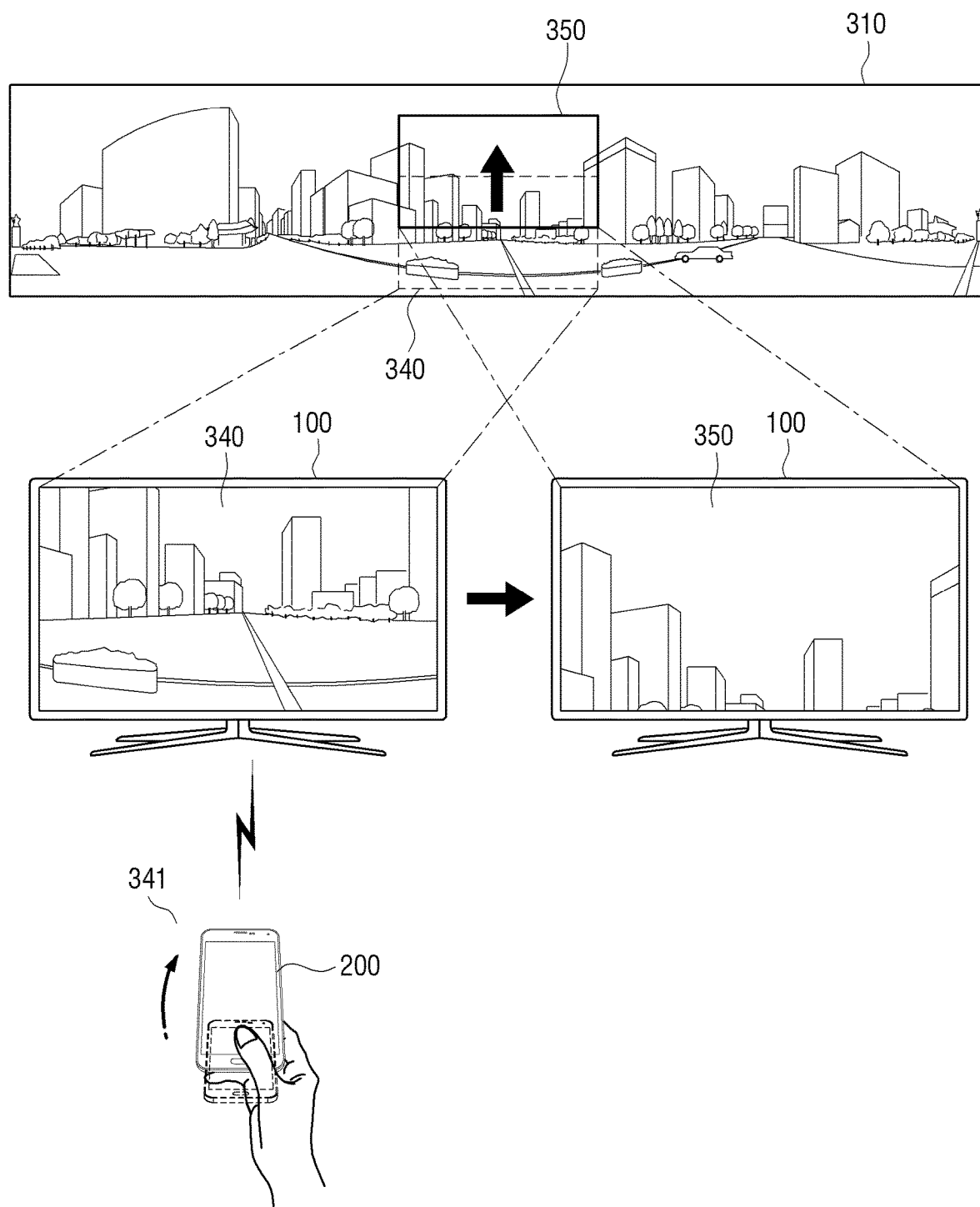
Figure 3C:
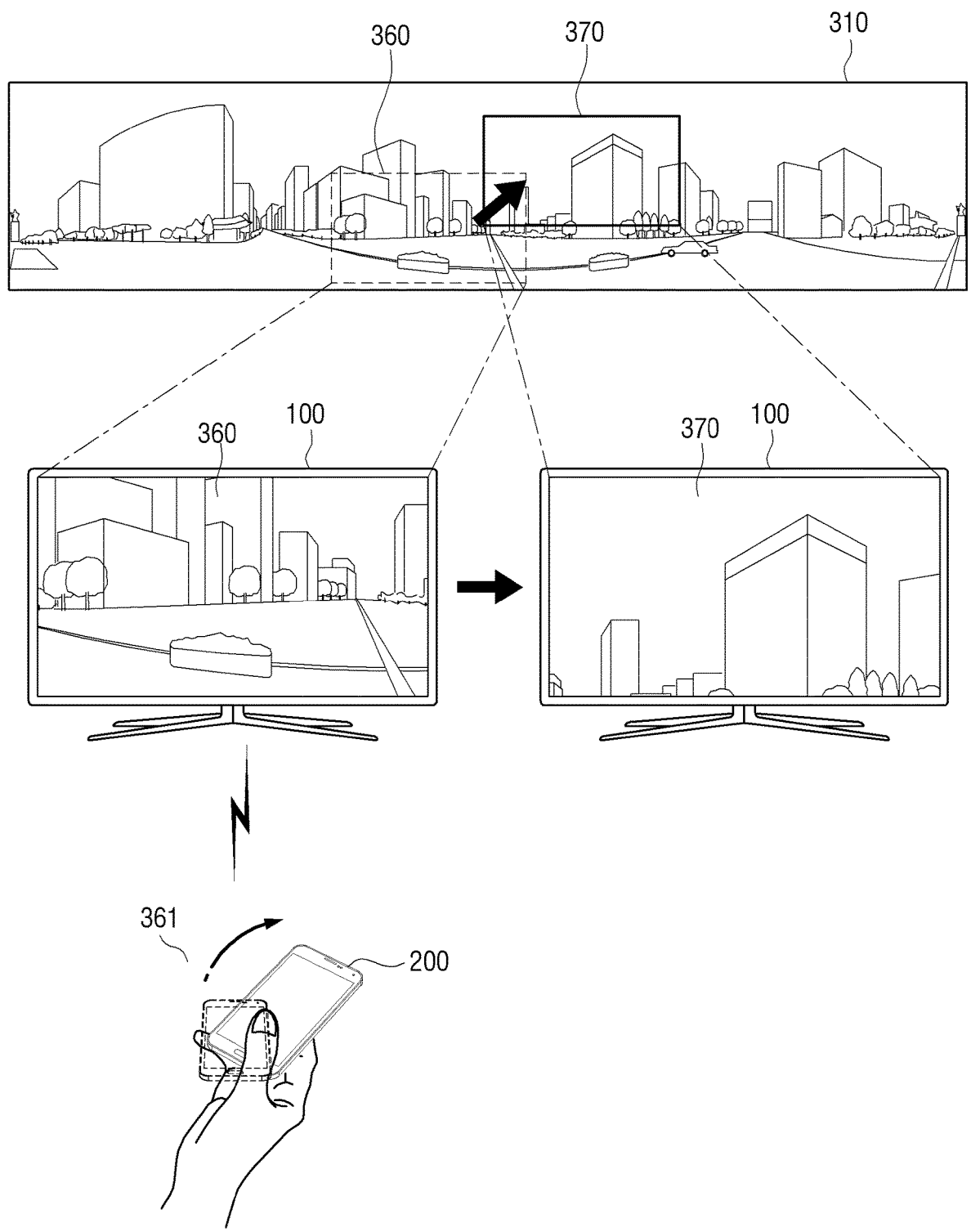

FIGS. 3A to 3C are views illustrating changing a direction of a display viewpoint area according to an exemplary embodiment.

FIG. 3A illustrates a view in which the display viewpoint area is changed to a right side.

When the user terminal device 200 is moved to the right 321 in a predetermined area of the user terminal device 200, for example, the home button is touched, the user terminal device 200 transmits the motion information including the trigger signal and the rightward motion to the display device 100. In this case, the display device 100 can continuously change the viewpoint area 320 currently displayed in the VR contents 310 in the right direction based on the received motion information. Thereafter, when the user finishes touching and receives a predetermined signal from the user terminal device 200, the display device 100 can terminate the change of the display viewpoint area and display the corresponding viewpoint area 330.

FIG. 3B illustrates that a display viewpoint area is changed upward.

When the user terminal device 200 is moved upward 341 in a state where a predetermined area of the user terminal device 200 is touched, the user terminal device 200 transmits motion information including the trigger signal and the upward motion to the display device 100. In this case, the display device 100 can continuously change the viewpoint area 340 currently displayed in the VR contents 310 in an upward direction based on the received motion information. Thereafter, when the user finishes touching and receives a predetermined signal from the user terminal device 200, the display device 100 may stop changing the display viewpoint area and display the corresponding viewpoint area 350.

FIG. 3C illustrates that a display viewpoint area is changed in a diagonal direction.

When the user terminal device 200 is moved in a diagonal direction 361 in a state where a predetermined area of the user terminal device 200 is touched, the user terminal device 200 transmits motion information including the trigger signal and the diagonal direction motion to the display device 100. In this case, the display device 100 can continuously display and change the viewpoint area 360 currently being displayed in the VR contents 310 in the diagonal direction based on the received motion information. Thereafter, when the user finishes touching and receives a predetermined signal from the user terminal device 200, the display device 100 can stop changing the display viewpoint area and display the corresponding viewpoint area 370.

FIGS. 3A to 3C illustrate a case where the user terminal device 200 moves in one direction. However, when the moving direction of the user terminal device 200 is changed, the display device 100 may continuously change the display viewpoint area to correspond to the changed moving direction and display the same. For example, when the user terminal device 200 having a predetermined area touched moves to the right and then moves upward, the display device 100 changes the display viewpoint area to the right direction, that is, after changing the display viewpoint area so that an image area in a right side of the image area currently displayed at the center of the screen is positioned at a center of the screen, and may continuously change the display viewpoint area so that an image area in an upside of the image area displayed at the center of the screen is positioned at the center of the screen.

Figure 4:
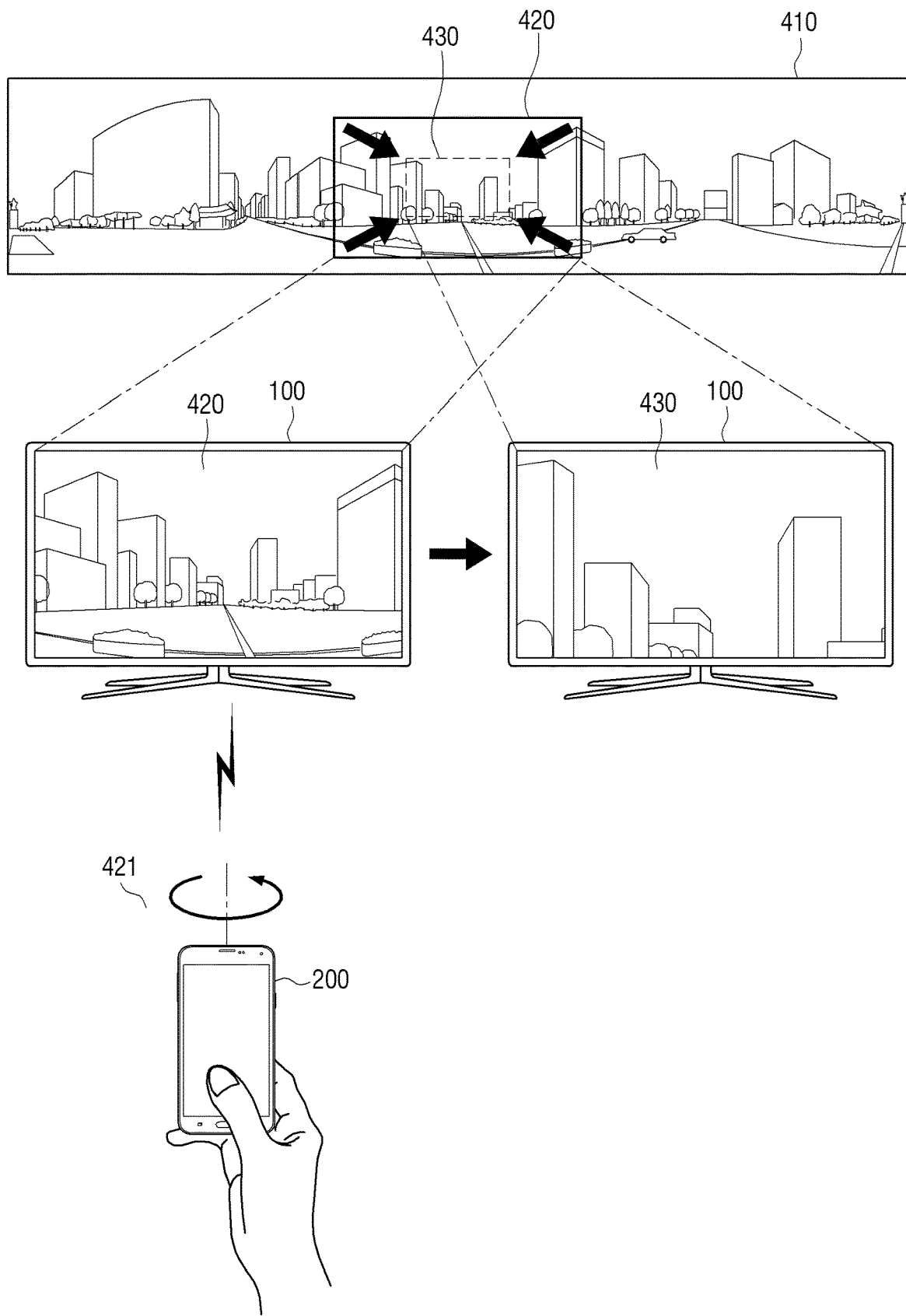
FIG. 4 is a view illustrating enlargement of a display viewpoint area according to an embodiment.

FIG. 4 is a view illustrating enlargement of a display viewpoint area according to an exemplary embodiment.

According to FIG. 4, if the user terminal device 200 is rotated clockwise 421 in a state where a predetermined area of the user terminal device 200 is touched, the user terminal device 200 transmits motion information including a trigger signal and a zoom-in an instruction to the display device 100. In this case, the display device 100 can enlarge and display the viewpoint area 420 currently being displayed in the VR contents 410 until the predetermined signal is received, based on the received motion information. Thereafter, when the user ends the touch and receives a predetermined signal from the user terminal device 200, the display device 100 can stop the enlargement of the display viewpoint area and display the corresponding viewpoint area 430.

When the user terminal device 200 is rotated in the counterclockwise direction in a state where a predetermined area of the user terminal device 200 is touched, the user terminal device 200 transmits motion information including a trigger signal and a zoom-out instruction to the display device 100. In this case, the display device 100 can reduce the viewpoint area currently displayed in the VR contents based on the received motion information until the predetermined signal is received. Thereafter, when the user finishes touching and receives a predetermined signal from the user terminal device 200, the display device 100 can stop the reduction of the display viewpoint area and display the corresponding viewpoint area.

In the meantime, the enlarging or reducing motion is not limited to a motion for rotating the user terminal device clockwise or counterclockwise, and may be a motion to move the user terminal device 200 backward or forward.

Figure 5A:
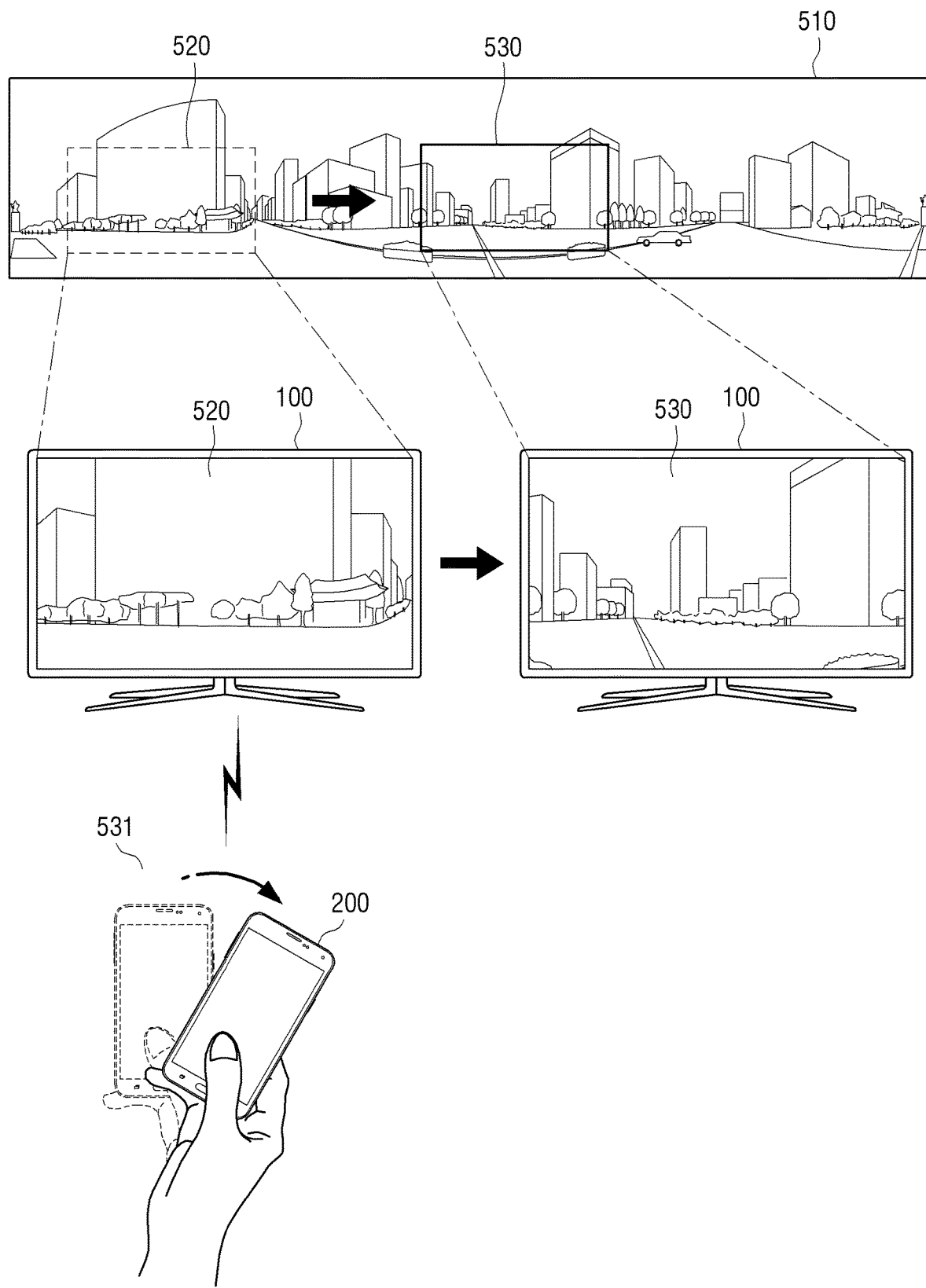
FIGS. 5A and 5B are views illustrating that a display viewpoint area is changed by different speeds based on a motion speed according to an embodiment.
Figure 5B:
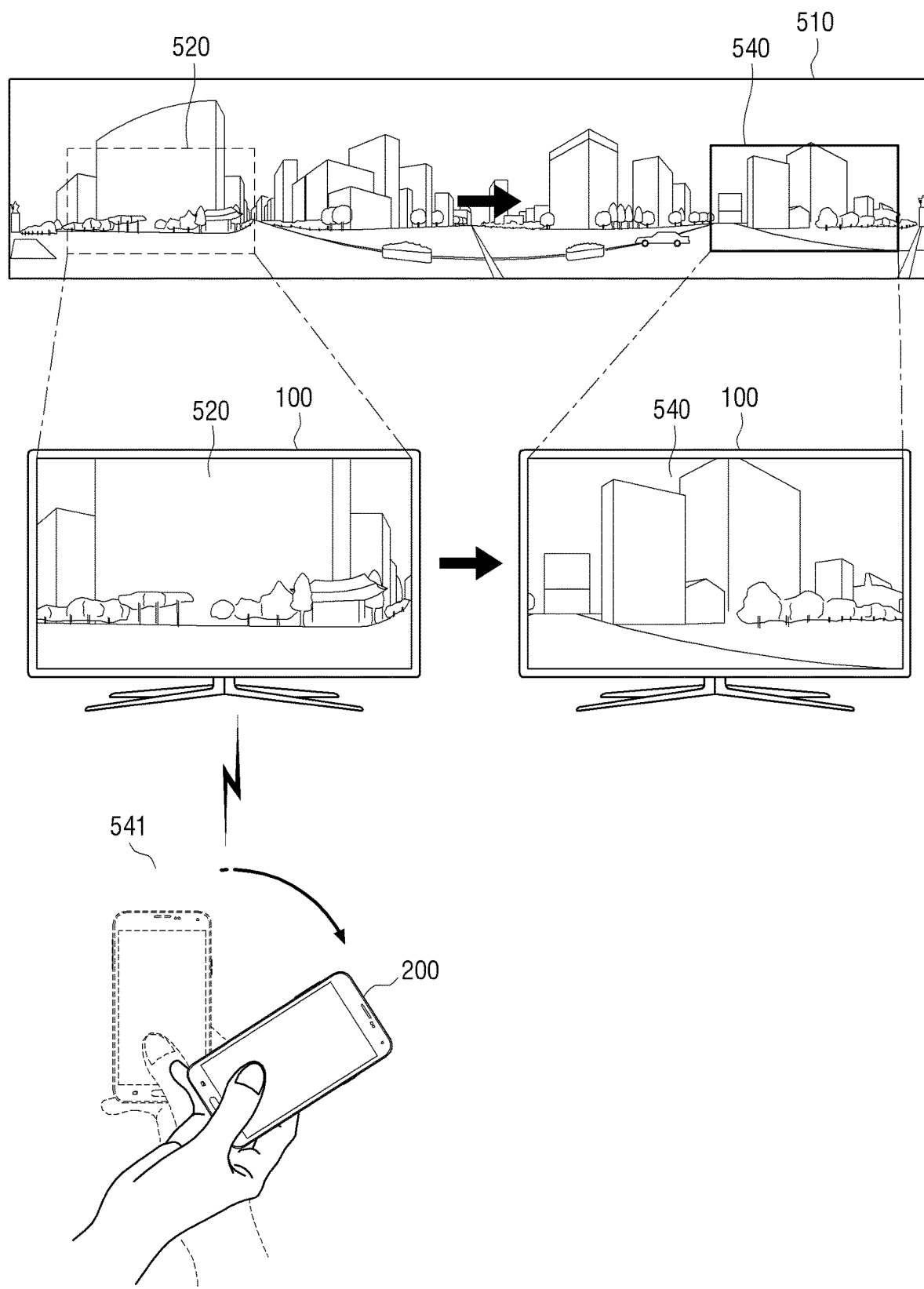

FIGS. 5A and 5B are views illustrating that a display viewpoint area is changed by different speeds based on a motion speed according to an exemplary embodiment.

According to FIG. 5A, when a predetermined area of the user terminal device 200 is touched and the user terminal device 200 is moved to the right at a speed that is less than the first threshold 531, the user terminal device 200 transmits motion information including the trigger signal and the rightward motion to the display device 100. In this case, the display device 100 can display the viewpoint area 520 currently being displayed in the VR contents 510 by moving the viewpoint area 520 rightward after changing to the first speed. Thereafter, when the user finishes touching and receives a predetermined signal from the user terminal device 200, the display device 100 can stop the change of the display viewpoint area and display the corresponding viewpoint area 530.

That is, when a display viewpoint area which a user desires to view approaches the currently displayed viewpoint area, a user may move the user terminal device 200 at a speed which is equal to or greater than the predetermined value and less than the first threshold. Accordingly, the processor 130 may change the display viewpoint area to the first speed which is relatively slow so that a desired viewpoint area can be accurately selected.

According to FIG. 5B, when the user terminal device 200 is moved to the right by a predetermined threshold value or more at a speed lower than the second threshold value in a state in which a predetermined area of the user terminal device 200 is touched 541, the user terminal device 200 transmits the motion information including the trigger signal and the rightward motion to the display device 100. In this case, the display device 100 can display the viewpoint area 520 currently displayed in the VR contents 510 by changing the second view speed area 520 to the second speed based on the received motion information. Thereafter, when the user ends the touch and receives a predetermined signal from the user terminal device 200, the display device 100 can stop the change of the display viewpoint area and display the corresponding viewpoint area 540.

That is, in a case where the display viewpoint area is distant viewpoint area from the currently displayed viewpoint area, a user may move the user terminal device 200 by the first threshold value or more. Accordingly, the processor 130 may change the display viewpoint area at a relatively rapid speed and display the viewpoint area desired by the user within a short time.

FIGS. 5A and 5B illustrate a case where the user terminal device 200 is moved in the right direction, but this is merely an example. When the moving direction of the user terminal device 200 is changed, the display viewpoint area may be continuously changed based on the speed of the user terminal device 200 moving in each direction. For example, when the user terminal device 200 having a predetermined area touched moves to the right direction at a speed lower than the first threshold and moves to the upper side at a speed greater than or equal to the first threshold and lower than the second threshold, the display device 100, after changing the display viewpoint area to the first speed so that an image area in a right side of the image area currently displayed at the center of the screen is positioned at a center of the screen, and change the display viewpoint area to the second speed so that an image area in an upside of the image area displayed at the center of the screen is positioned at the center of the screen.

Figure 6:
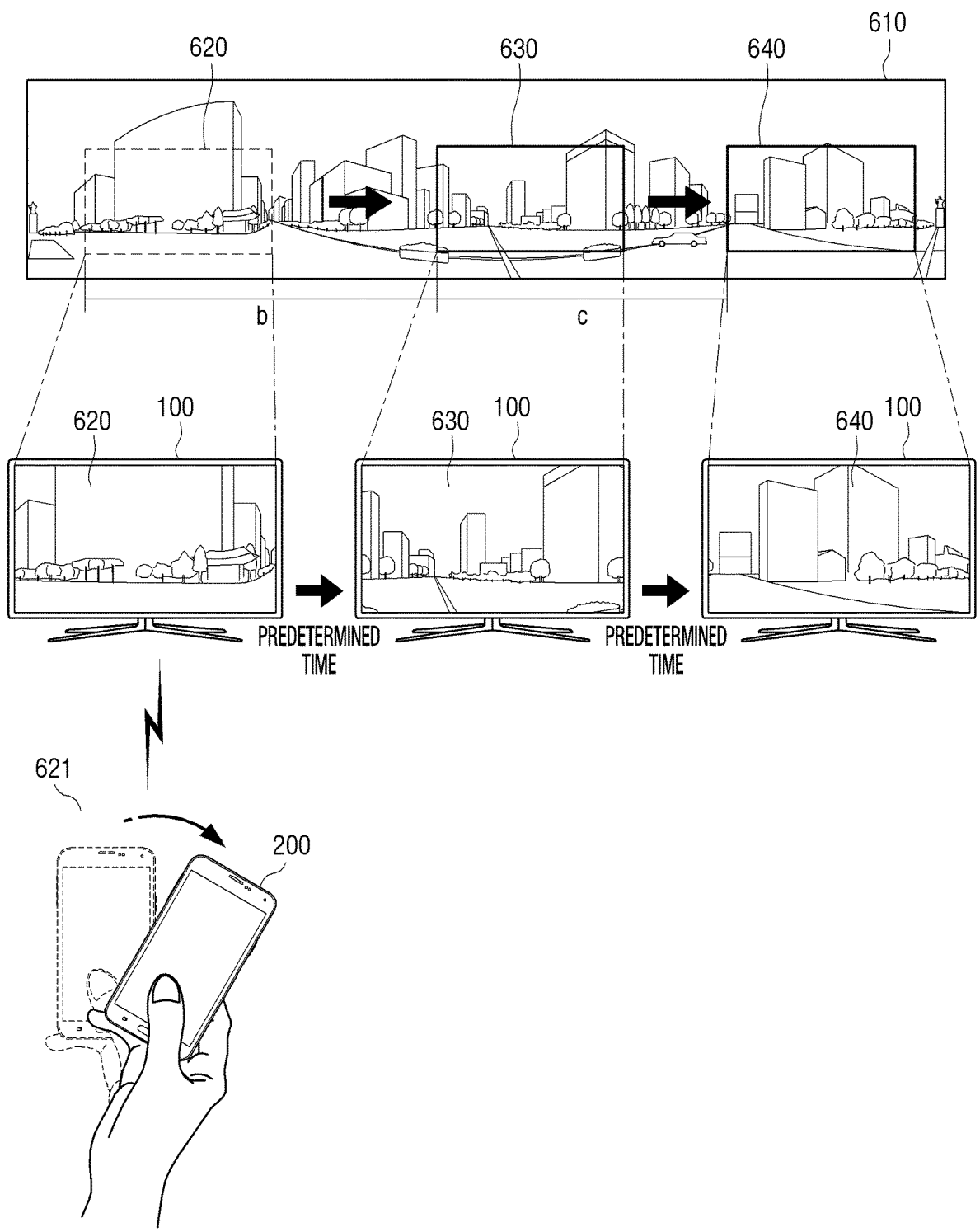
FIG. 6 is a view illustrating changing a moving speed of a display viewpoint area according to an embodiment.

FIG. 6 is a view illustrating changing a moving speed of a display viewpoint area according to an exemplary embodiment.

While the predetermined area of the user terminal device 200 is touched, when the user terminal device 200 is moved to a specific direction and the predetermined time is elapsed, the speed of changing the display viewpoint can be gradually reduced.

According to FIG. 6, when the user terminal device 200 is moved to the right 621 in a state where a predetermined area of the user terminal device 200 is touched, the user terminal device 200 transmits the motion information including the trigger signal and the right motion to the display device 100. In this case, the display device 100 can continuously change the viewpoint area 620 currently displayed in the VR contents 610 in the right direction based on the received motion information. Here, the viewpoint area is moved 630 by a distance b for a predetermined time (for example, one second) from the point of time when the display viewpoint area is changed, and then the viewpoint area may be moved by c distance which is shorter than b for a predetermined time (for example, one second) 640.

That is, the processor 130 may gradually reduce the display viewpoint change speed when time is elapsed. Accordingly, the processor 130 may enable a user to correctly select the display viewpoint area a user wishes to view.

The processor 130 may gradually reduce a speed at which the display viewpoint area is changed so that speed becomes zero, and if the speed is reduced up to a predetermined speed, the corresponding speed can be maintained.

FIG. 6 illustrates a case where the user terminal device 200 is moved in the right direction, but this is merely an example. When the moving direction of the user terminal device 200 is changed, the display device 100 can continuously change and display the display viewpoint area so as to correspond to the changed moving direction. For example, when the user terminal device 200 having the predetermined area touched moves to the right side for two seconds and then moves upward, an image area which is positioned in a right side by distance b from the image area which is currently displayed at the center of the screen is moved after one second from the change of the display viewpoint area, and after one second, a viewpoint area is moved so that an image area which is in a right side by c distance, which is shorter than b, is positioned at the center of the screen from the image area currently displayed at the center of the screen.

After one second, the viewpoint area is shifted so that the image area on the upper side is positioned at the center of the screen by b distance based on the image area displayed in the center of the current screen. After the next one second, the display viewpoint area can be continuously changed so that the image area at an upper position is positioned at the center of the screen by a distance c shorter than b. However, specific numerical values indicating time are examples, and the present disclosure is not limited thereto.

Figure 7:
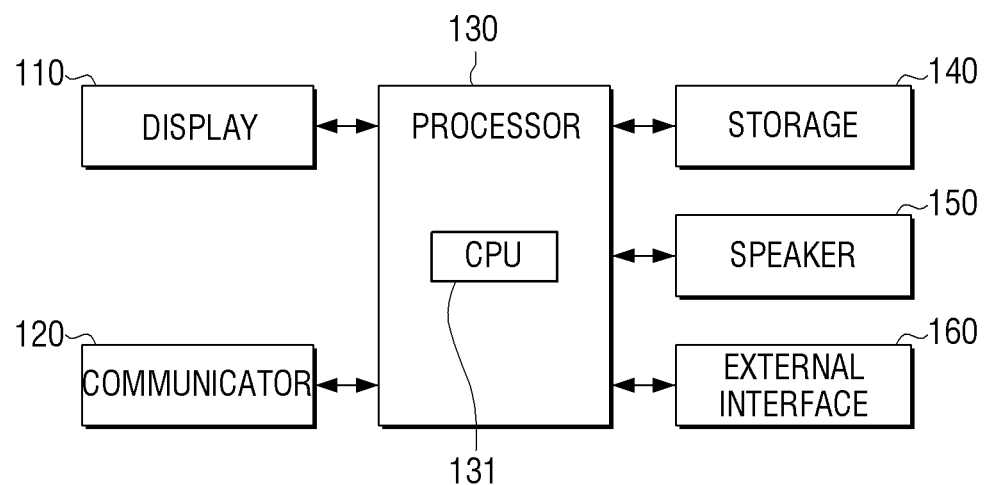
FIG. 7 is a block diagram illustrating a detailed configuration of a display device according to an embodiment.

FIG. 7 is a block diagram illustrating an example of a detailed configuration of a display device.

According to FIG. 7, the display device 100 includes a display 110, a communicator 120, a processor 130, a storage 140, a speaker 150, and an external interface 160. From among the configurations in FIG. 7, the configuration overlapped with the configuration of FIG. 2 will not be further described.

The processor 130 may include CPU 131, ROM (or non-volatile memory) where a control program is stored for the control of the display device 100, and RAM (or volatile memory) which is used for storing data input from the outside of the display 100 or is used as a storage area corresponding to various operations performed in the display device 100.

The processor 130, when a predetermined event occurs, may execute an operating system (OS), program, and various applications stored in the storage 140. The processor 130 may include a single core, a dual core, a triple core, a quad core, and a multiple of a core.

The CPU 131, by accessing the storage 140, performs booting by using the O/S stored in the storage 140. In addition, by using various programs, contents, and data stored in the storage 140, the CPU performs various operations.

The storage 140 may store various data, programs, or applications for driving/controlling the display device 100. The storage 140 may store a control program for controlling the display device 100 and the processor 130, applications, databases, or related data originally provided or downloaded from a manufacturer. For example, the storage 140 may provide a UI for multi-channel configuration according to various exemplary embodiments of the present disclosure, and may store a program for performing an operation related to the UI.

Here, the storage 140 may be implemented as an internal memory such as a ROM or a RAM included in the processor 130 or may be implemented as a separate memory from the processor 130. In this case, the storage 140 may be implemented as a memory embedded in the display device 100 or a removable memory in the display device 100 depending on the purpose of data storage. For example, data for driving the display device 100 may be stored in a memory embedded in the display device 100, and data for an extension function of the display device 100 may be stored in a detachable memory of the display device 100. In case of the memory embedded in the display device 100, it may be implemented in the form of a nonvolatile memory, a volatile memory, a hard disk drive (HDD), or a solid state drive (SSD).

The speaker 150 functions to output an audio signal. For example, the speaker 150 may include a plurality of speaker units (or audio amplifiers) capable of outputting multi-channels. For example, the speaker 150 may include an L channel speaker and an R channel speaker for reproducing the L channel and the R channel, respectively. However, the present disclosure is not limited thereto, and the speaker 150 may be implemented in various forms. As another example, the speaker 150 may be implemented in the form of a sound bar for reproducing the L channel, the R channel, and the center channel.

The processor 130 may communicate with the external interface 160. The external interface 160 may be a wired interface or a wireless interface. For example, the external interface can be a wired interface such as Universal Serial Bus (USB) or a wireless interface such as Bluetooth.

Figure 8:
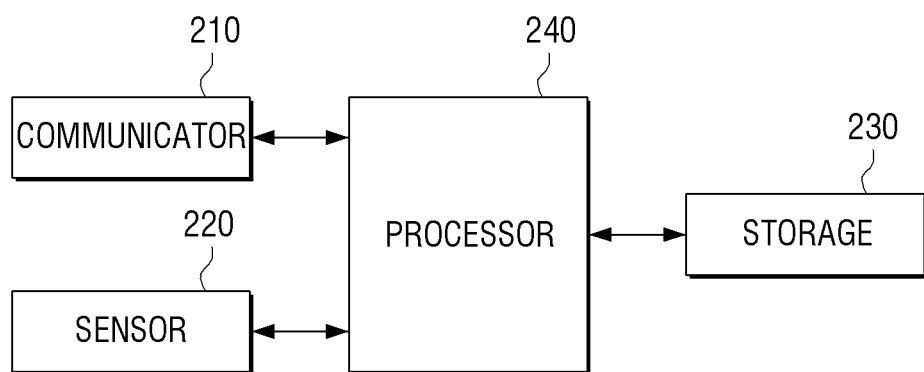
FIG. 8 is a block diagram illustrating a user terminal device according to an embodiment.

FIG. 8 is a block diagram illustrating a user terminal device according to an exemplary embodiment.

According to FIG. 8, the user terminal device 200 includes a communicator 210, a sensor 220, a storage 230, and a processor 240.

The communicator 210 performs communication with the display device 100. Specifically, the communicator 210 can transmit a trigger signal for continuously changing the display viewpoint area of the VR content and motion information of the user terminal device 200.

The sensor 220 can sense motion recognition of the user terminal device 200 when a trigger signal is input. For example, when a predetermined area of the user terminal device 200 is touched, the sensor 220 senses it and recognizes it as a trigger signal, and can detect motion recognition of the user terminal device 200 thereafter. However, the present disclosure is not limited thereto, and the sensor 220 may recognize the motion regardless of the trigger signal input.

The sensor 220 may measure acceleration and angular velocity to sense motion recognition. For example, the sensor 220 may include an acceleration sensor and a gyro sensor. Using the six axes of the acceleration sensor and the gyro sensor, the sensor 220 can sense the start position and the current position of the movement of the user terminal device 200, and can measure the velocity change and the position change amount.

The acceleration sensor can sense gravity direction. In addition, the acceleration sensor can detect the incline in the non-moving state. The acceleration sensor senses the amount of change in speed with respect to the unit time. The acceleration sensor can be implemented in three axes. When implemented as a three-axis acceleration sensor, the acceleration sensors are provided with X, Y, and Z-axis acceleration sensors arranged in different directions and are orthogonal to each other.

The acceleration sensor converts the output values of the X, Y, and Z axis acceleration sensors into digital values and provides them to the preprocessor. At this time, the preprocessor may include a chopping circuit, an amplifying circuit, a filter, and an A/D converter. Accordingly, the electric signal output from the three-axis acceleration sensor is chopped, amplified, and filtered, and then converted into a digital voltage value.

The gyro sensor detects the angular velocity by detecting a change amount of the predetermined direction of the user terminal device 200 for a unit time. As the gyro sensor, a gyroscope having three axes can be used. The gyro sensor can infer the angle through the definite integral of the detected angular velocity.

The storage 230 may store various data, programs, or applications for driving/controlling the user terminal device 200. In particular, the storage 230 may store a specific application for processing motion for controlling the display device 100 and transmitting motion information to the display device 100. For example, the application may process the information of the motion direction, the motion speed, the rotation direction, and the rotation speed recognized by the sensor 220 into a form that can be controlled by the display device 100 and transmit the information to the display device 100.

The processor 240 controls overall operations of the user terminal device 200.

The processor 240 controls the sensor 220 to start motion recognition when a specific trigger operation is detected by the sensor 220. For example, when a specific trigger operation is detected, the processor 240 may activate the motion recognition sensor to perform motion recognition, generate motion information, and transmit the generated motion information to the display device 100. Alternatively, the processor 240 may transmit only the generated motion information to the display device 100 when a specific trigger operation is detected while the motion recognition sensor is activated and motion information is being generated.

Here, the trigger operation may be a touch of a screen, a touch of a specific area of a screen, a predetermined button touch, a predetermined button push operation, or the like. The processor 240 transmits the trigger signal generated based on the trigger operation and information corresponding to the motion recognized through the sensor 220 to the display device 100 through the communicator 210. Here, the motion information may include at least one of a motion direction, a motion speed, a rotation direction, and a rotation speed.

The processor 240 may generate motion information through the corresponding application while a specific application that is stored in the storage 230 is being operated.

Accordingly, when the processor 240 detects a motion that can generate motion information in a specific application stored in the storage 230, for example, a motion different from a specific motion stored in a specific application, the processor 240 may provide feedback information to inform the user that the motion is not valid motion recognition. This feedback can be, for example, in the form of vibrating the user terminal device 200, or outputting a specific sound or voice. Alternatively, feedback may output a specific message or image on the screen of the user terminal device 200, or it may be in the form of lighting the auxiliary LED.

The present disclosure is not limited thereto, and the processor 240 may notify a user that the motion recognition is valid motion recognition, and may inform of a user valid motion recognition and non-valid motion recognition by setting different notifications.

The processor 240 may control the sensor 220 to recognize the motion based on the start position of the motion of the user terminal device 200. For example, when the user touches the user terminal device 200 in a sitting or standing state to take a motion, generally, the user terminal device 200 can start moving in a horizontal state with respect to the ground. In this case, the processor 240 can recognize the motion by controlling the sensor 220 based on the motion that starts in a horizontal state with respect to the ground. In addition, when the user touches the user terminal device 200 in a state where the user lies down and takes a motion, the user terminal device 200 generally can start moving in a state perpendicular to the ground. In this case, the processor 240 can recognize the motion by controlling the sensor 220 on the basis of the motion that starts in a state perpendicular to the ground.

Accordingly, even if a user takes a user motion in any posture, the processor 240 recognizes a motion based on a starting position of the movement, a user may change the display viewpoint area easily in a direction which a user desires.

Figure 9:
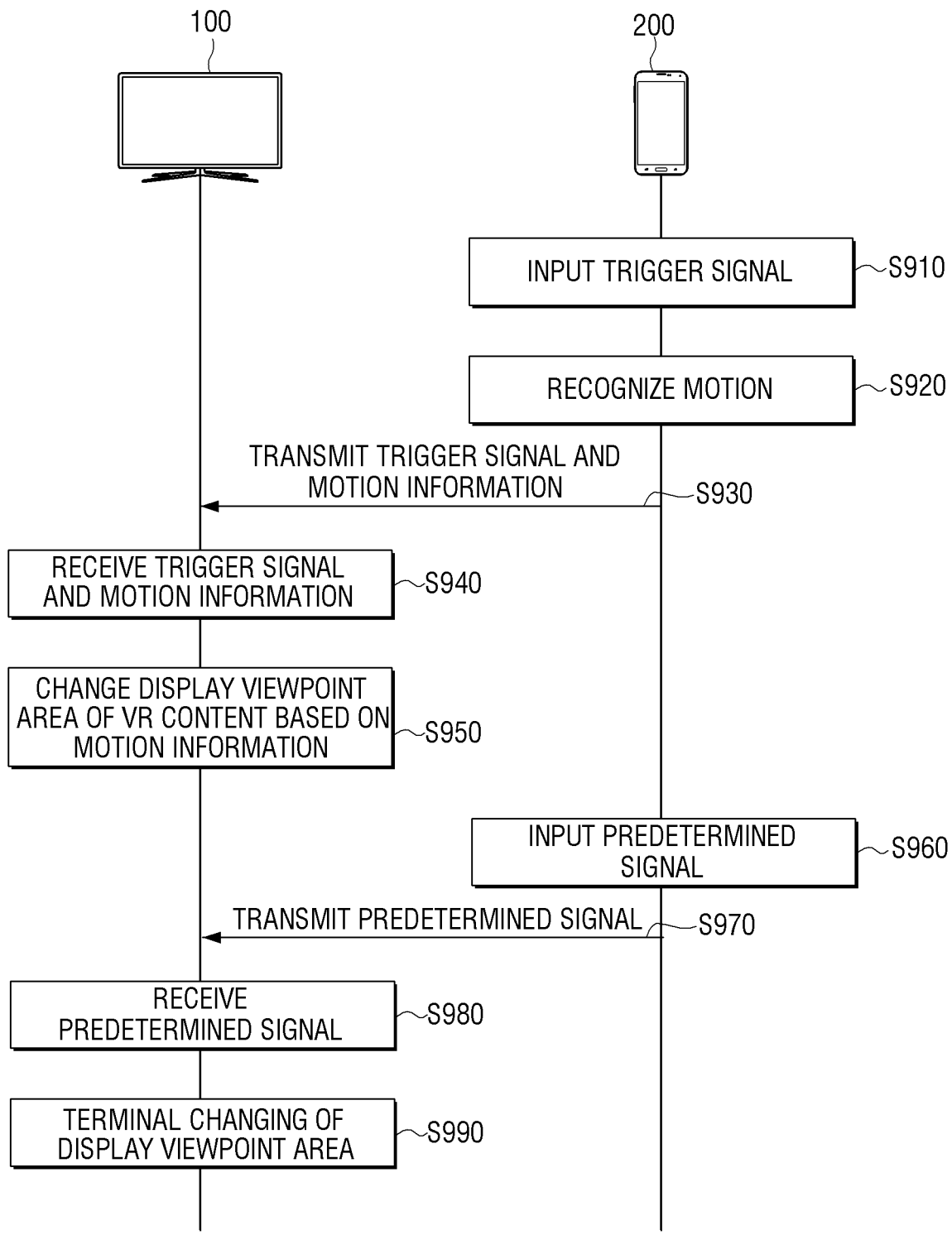
FIG. 9 is a sequence diagram illustrating mutual operations of a display device and a user terminal device according to an embodiment.

FIG. 9 is a sequence diagram illustrating mutual operations of a display device and a user terminal device according to an exemplary embodiment.

According to FIG. 9, when a predetermined area of the user terminal device 200 is touched and a trigger signal is input in operation S910, and while a touch state is maintained, the user terminal device 200 recognizes a motion in operation S920 and transmits the trigger signal and the recognized motion information to the display device 100 in operation S930.

The display device 100 may receive the trigger signal for changing a display viewpoint area of the VR contents and the motion information of the user terminal device 200 from the user terminal device 200 in operation S940 and continuously change the display viewpoint area of the VR content based on the motion information until the predetermined signal is received and display the same in operation S950. Thereafter, the user terminal device 200, when the touch is finished and the predetermined signal is input in operation S960, may transmit the predetermined signal to the display device 100 in operation S970. The display device 100, when the predetermined signal is received in operation S980, may terminate changing the display viewpoint area in operation S990.

The user terminal device 200 may transmit a trigger signal to the display device 100 according to a screen touch of the user terminal device 200, and when the screen touch is terminated, the user terminal device may transmit the predetermined signal.

The user terminal device 200 may transmit the updated motion information to the display device 100 when the motion information of the user terminal device 200 is updated while the screen touch is maintained. The user terminal device 200 may not transmit the motion information if there is no change in the motion information. If the motion information is not received, the display device 100 determines that the last received motion information is maintained, and may perform an operation corresponding to the last received motion information until a predetermined signal is received. Thereafter, the user terminal device 200 may transmit the updated motion information to the display device 100 when the motion information is updated. However, the present disclosure is not limited thereto, and the user terminal device 200 may recognize the motion and transmit the motion to the display device 100 in real time.

Figure 10:
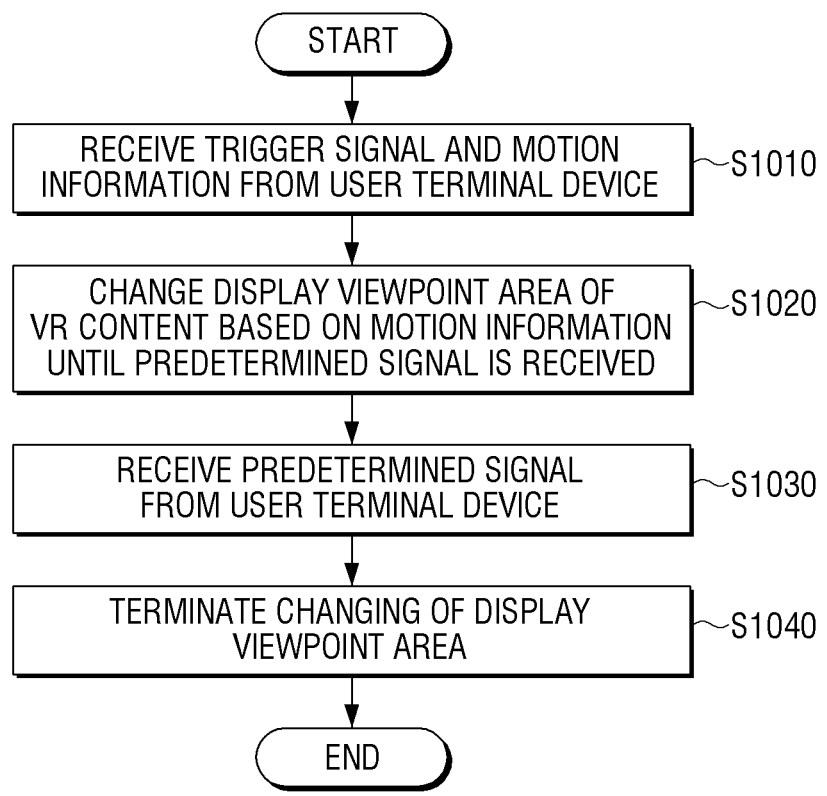
FIG. 10 is a flowchart illustrating a control method of a display device according to an embodiment.

FIG. 10 is a flowchart to describe a control method of a display device according to an exemplary embodiment.

According to FIG. 10, when the trigger signal and the motion information are received from the user terminal device 200 in operation S1010, the display device 100 may change the display viewpoint area until the predetermined signal is received (in operation S1020). Then, when a predetermined signal is received from the user terminal device 200 in operation S1030, the display device 100 may terminate the change of the display viewpoint area in operation S1040.

Detailed description of each step has been described and thus will not be further described.

Figure 11:
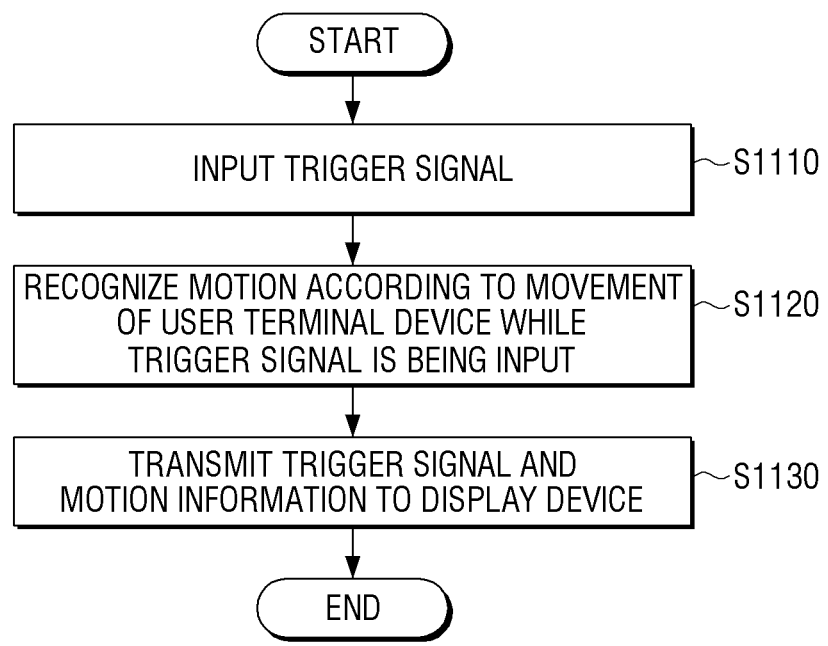
FIG. 11 is a flowchart illustrating a control method of a user terminal device according to an exemplary embodiment.

FIG. 11 is a flowchart to describe a control method of a user terminal device according to an exemplary embodiment.

According to FIG. 11, when a predetermined area of the user terminal device 200 is touched and a trigger signal is input in operation S1110, the user terminal device 200 can recognize a motion of the user terminal device 200 according to the motion of the user terminal device 200 in operation S1120. The user terminal device 200 may transmit the trigger signal and the recognized motion information to the display device 100 in operation S1130. Thereafter, when the touch ends and a predetermined signal is input, the user terminal device 200 can transmit a predetermined signal to the display device 100 in operation S1140.

The various exemplary embodiments described above may be embodied in a recording medium which can be read by a computer or a similar device using software, hardware, or a combination thereof. In some cases, the embodiments described herein may be implemented by the processor itself. According to a software implementation, exemplary embodiments such as the procedures and functions described herein may be implemented in separate software modules. Each of the software modules may perform one or more of the functions and operations described herein.

Meanwhile, computer instructions for performing the processing operations according to various embodiments of the present disclosure described above may be stored in a non-transitory computer-readable medium. Computer instructions stored on such non-volatile computer-readable media may cause a specific device to perform processing operations according to various embodiments described above when executed by a processor.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing exemplary embodiments and advantages are merely exemplary and are not to be construed as limiting the present disclosure. The present disclosure can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display device, comprising:
   a display;
   a communicator; and
   a processor configured to:
      control the display to display virtual reality (VR) content,
      based on a trigger signal and motion information to change a display viewpoint area of the VR content being received from an external device through the communicator, control the display to change the display viewpoint area of the VR content being displayed on the display in a first motion direction based on the first motion direction corresponding to a motion direction of the external device and included in the motion information, and
      in response to receiving a predetermined signal from the external device through the communicator, control the display to terminate changing the display viewpoint area of the VR content on the display.

2. The display device of claim 1, wherein the processor is further configured to, while the display viewpoint area of the VR content is being changed based on the first motion direction, change the display viewpoint area of the VR content based on a second motion direction included in the motion information and being different from the first motion direction, until the predetermined signal is received.

3. The display device of claim 1, wherein the processor is further configured to, based on a motion speed included in the motion information being greater than or equal to a predetermined value, change the display viewpoint area of the VR content based on the first motion direction.

4. The display device of claim 1, wherein the processor is further configured to change the display viewpoint area of the VR content at a predetermined speed based on the first motion direction.

5. The display device of claim 1, wherein the processor is further configured to:
   based on a motion speed included in the motion information being equal to or greater than a predetermined value and less than a first threshold, set a speed at which a display viewpoint area of the VR content is changed to a first speed, and
   based on the motion speed being equal to or greater than the first threshold and less than a second threshold, set the speed at which a display viewpoint area of the VR content is changed to a second speed, different from the first speed.

6. The display device of claim 1, wherein the processor is further configured to enlarge or reduce the displayed VR content based on a third motion direction included in the motion information, until the predetermined signal is received.

7. The display device of claim 1, wherein the processor is further configured to continue changing the display viewpoint area of the VR content based on the first motion direction without additional motion information from the external device until the predetermined signal is received.

8. The display device of claim 1, wherein the processor is configured to:
   periodically receive the motion information from the external device, and continue changing the display viewpoint area of the VR content based on the first motion direction when the motion information newly received indicates no movement of the external device, until the predetermined signal is received.

9. The display device of claim 1, wherein the motion information is obtained from a predetermined application installed in the external device.

10. A display system, comprising:
a display device configured to display a virtual reality (VR) content; and
an external device configured to sense a motion for controlling the display device and transmit motion information based on the sensed motion to the display device,
wherein the display device is configured to:
based on a trigger signal and the motion information transmitted by the external device, change a display viewpoint area of the VR content, wherein the display viewpoint area of the VR content is changed in a first motion direction based on the first motion direction corresponding to a motion direction of the external device and included in the motion information, and
in response to the display device receiving a predetermined signal from the external device, control the display to terminate changing the display viewpoint area.

11. The display system of claim 10, wherein the display device is further configured to, while the display viewpoint area of the VR content is being changed based on the first motion direction, change the display viewpoint area of the VR content based on a second motion direction included in the motion information and being different from the first motion direction, until the predetermined signal is received.

12. The display system of claim 11, wherein the external device is further configured to, based on the motion information being updated while a screen touch is maintained on the external device, transmit the updated motion information to the display device.

13. A method of controlling a display device, the method comprising:
receiving, from an external device, a trigger signal for changing a display viewpoint area of VR content and motion information;
changing, by the display device, the display viewpoint area of the VR content displayed on the display device in a first motion direction based on the first motion direction corresponding to a motion direction of the external device and included in the motion information; and
in response to receiving a predetermined signal from the external device, terminating the changing of the display viewpoint area by the display device.

14. The method of claim 13, wherein the changing of the display viewpoint area further comprises, while the display viewpoint area of the VR content is being changed based on the first motion direction, changing the display viewpoint area of the VR content based on a second motion direction which is included in the motion information and which is different from the first motion direction, until the receiving of the predetermined signal.

15. The method of claim 13, wherein the changing of the display viewpoint area further comprises, based on a motion speed included in the motion information being greater than or equal to a predetermined value, changing the display viewpoint area of the VR content based on the first motion direction.

16. The method of claim 13, wherein the changing of the display viewpoint area further comprises changing the display viewpoint area of the VR content at a predetermined speed based on the first motion direction.

17. The method of claim 13, wherein the changing of the display viewpoint area further comprises:
based on a motion speed included in the motion information being equal to or greater than a predetermined value and less than a first threshold, setting a speed at which the display viewpoint area of the VR content is changed to a first speed; and
based on the motion speed being equal to or greater than the first threshold and less than a second threshold, setting the speed at which the display viewpoint area of the VR content is changed to a second speed, different from the first speed.

18. The method of claim 13, wherein the changing of the display viewpoint area further comprises continuously changing the display viewpoint area of the VR content being displayed based on the first motion direction without additional motion information from the external device until the predetermined signal is received.

19. The method of claim 13, further comprising:
periodically receiving the motion information from the external, device by the display device; and
continue changing the display viewpoint area of the VR content being displayed by the display device based on the first motion direction, when newly received motion information indicates no movement of the external device until the receiving of the predetermined signal.

20. The method of claim 13, wherein the changing of the display viewpoint area further comprises continuously displaying on the display device the changing display viewpoint area while the changing is occurring.

* * * * *